June 2, 1931.    G. CICALI    1,807,897
PROCESS OF OBTAINING SUBSTANTIALLY PURE HYDROGEN
Filed June 19, 1925
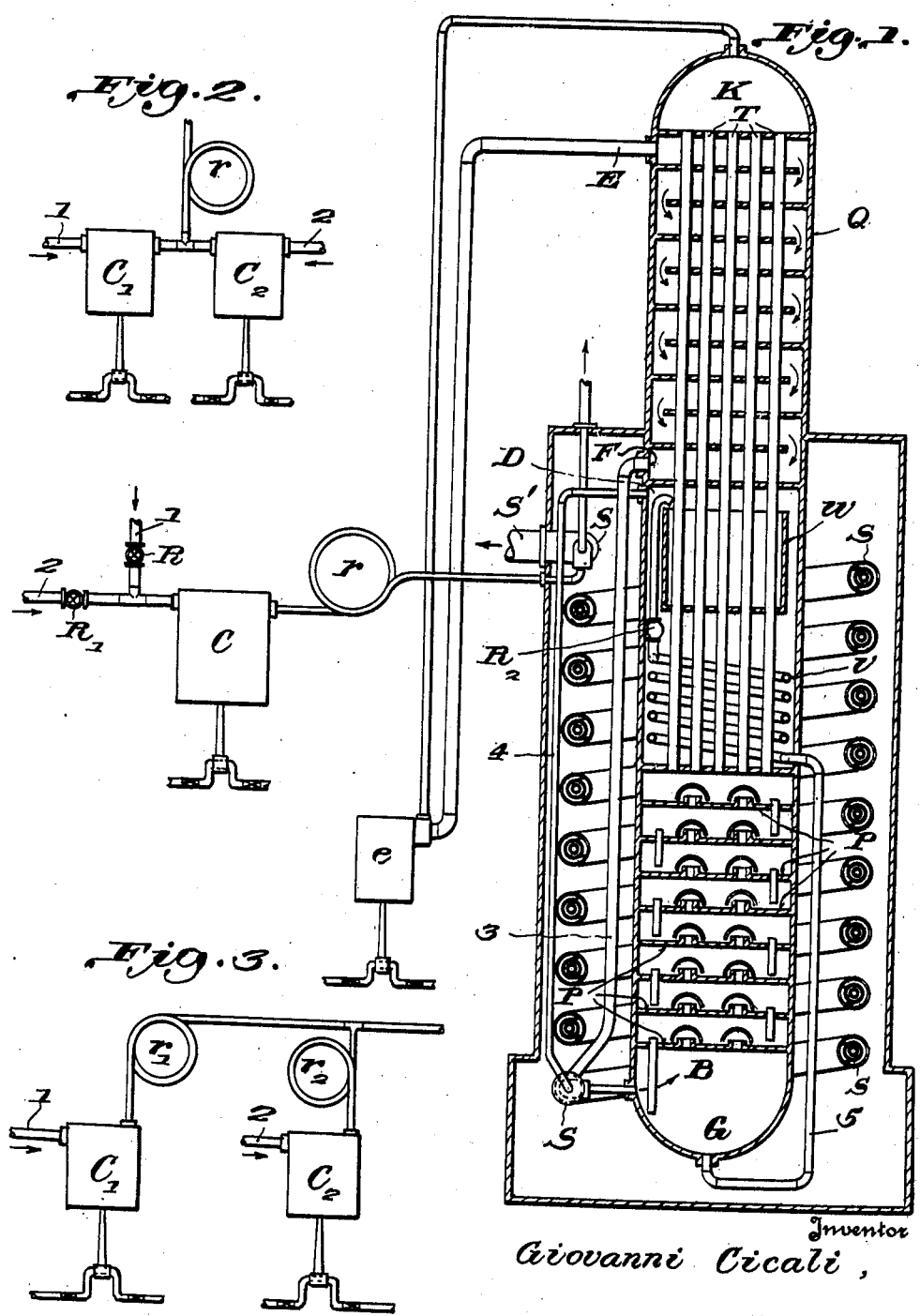
Inventor
Giovanni Cicali,
By Steward & McKay
his Attorneys Patented June 2, 1931

1,807,897

UNITED STATES PATENT OFFICE

GIOVANNI CICALI, OF BOLOGNA, ITALY

PROCESS OF OBTAINING SUBSTANTIALLY PURE HYDROGEN

Application filed June 19, 1925, Serial No. 38,385, and in Italy February 16, 1925.

Water gas (or the like), previously freed from sulphur and carbon dioxide and other gases that can be readily eliminated by the ordinary methods, is reduced to contain only hydrogen and carbon monoxide. The gaseous residue of this preliminary purification, viz. the whole of the hydrogen and carbon monoxide contained in the water gas, before treatment in the apparatus illustrated in Figs. 1-2-3, must be subjected to a preliminary treatment which may be carried out by any physical or chemical process preferred, in order to remove a portion of the carbon monoxide content. Referring to the drawings, Fig. 1 is a diagrammatic view, partly in section, of a system of apparatus suitable for carrying out the process of this invention, and Figs. 2 and 3 are diagrammatic views showing modified arrangement of compressors and coolers for use in the apparatus system illustrated in Fig. 1. After the preliminary treatment just referred to, the resulting mixture consisting of approximately the whole of the original hydrogen content of the water gas and a small amount of carbon monoxide, which is far less than was originally contained in the water gas, is conveyed by pipe 1 (Fig. 1) through the cock R controlling its flow and is mingled with such a weight of nitrogen supplied by pipe 2 through cock $R_1$ that the percentage of nitrogen plus carbon monoxide referred to the hydrogen present in the resulting mixture is equal to the percentage of the water gas carbon monoxide referred to the hydrogen present in the original water gas. That is, the nitrogen added equals the amount of carbon monoxide removed by preliminary purification.

The resulting mixture is compressed up to a certain pressure in the internally water-cooled compressor C. After leaving the compressor C the mixture undergoes a further cooling in the heat-exchange apparatus or refrigerator —r—. The said arrangement might also be replaced (Figs. 2 and 3) by two compressors $C_1$ and $C_2$; $C_1$ compressing the nitrogen and $C_2$ compressing the gaseous mixture as defined above resulting from the partial purification of the water gas, a single external refrigerator —r— as per Fig. 2 or two external refrigerators —$r_1$— and —$r_2$— as per Fig. 3, being provided.

From the refrigerator —r— (Fig. 1), or from the refrigerator —r— (Fig. 2), or from the two refrigerators —$r_1$— and —$r_2$— (Fig. 3), the mixture is led to the middle pipe of the three-pipe coil or heat-exchange device S. At the outside of this middle pipe flows in opposite direction, as will be seen later, the purified hydrogen (in the outer pipe) and, in the inner coil pipe, flow the nitrogen and carbon monoxide that have been separated from the hydrogen and are very cold; the mixture is therefore cooled. The mixture issuing from S is delivered through B into the column Q.

Here the mixture rising up through the pans P is bubbled through the liquid nitrogen with which the pans are filled. The more readily liquefiable component, viz. the carbon monoxide, tends to liquefy in greater proportions than the other components; simultaneously the pans, working as rectifiers, will let the more volatile gas, viz. the hydrogen, disengage itself in greater proportions. The carbon monoxide on liquefying will cause a portion of the nitrogen to volatilize, nitrogen being more volatile than carbon monoxide. The hydrogen, nitrogen and slight traces of carbon monoxide will move upward and enter the pipes T, where the greater portion of the nitrogen and the whole of the carbon monoxide, owing to the extremely low temperature, will condense and drop back into the pans P, while the hydrogen will become less rich in carbon monoxide as it gets nearer to the upper end of the column. The hydrogen that reaches the column top, freed of carbon monoxide but still containing traces of nitrogen, is conveyed through the outlet K to the expander —e— where, in consequence of the expanding work, its temperature is lowered. After expansion, the hydrogen returns through E into the column Q where it cools the gases flowing up through the tubes T of the column Q and goes to the column outlet F, whence it is led by a pipe 3 into the outer pipe of the coil S, there to further cool the gas mixture supplied by the compressor C or by the compressors $C_1$ and $C_2$ and is conveyed from the upper end of the heat exchange device S through an outlet S'.

The liquid carbon monoxide that has separated from the hydrogen and a large portion of the liquid nitrogen drop through the overflow tubes provided in the pans P to the bottom of the column Q, whence they pass up, through the outlet G and pipe 5, into an inner coil V. On issuing from coil V they are throttled by the cock $R_2$ to nearly atmospheric pressure and delivered into the tank W, where they evaporate and cool the gas flowing inside of the pipes T.

The nitrogen and carbon monoxide vapours leaving the column through the outlet D are led by the pipe 4 into the inner pipe of the heat exchange device S, where they cool the gas mixture flowing in opposite direction through the middle pipe, as already stated.

Should a single purification not suffice to supply hydrogen showing the degree of purity required for the uses for which the hydrogen is intended, the operation may be repeated in one or more further sets of apparatus identical to those described (Figs. 1-2-3), further nitrogen being added to the mixture in order to replace the carbon monoxide that has been removed by the previous operations, so that the proportion stated above be always preserved.

Having now particularly described and ascertained the nature of my said invention and in what manner the same is to be performed, I declare that what I claim is:—

1. The process of recovering hydrogen practically free from carbon monoxide and containing only traces of other gases from a mixture containing hydrogen and carbon monoxide such as water gas or the like, comprising removing a substantial portion of the carbon monoxide from the mixture by preliminary purification, diluting said partially purified mixture with a gas which liquefies at a higher temperature than that of hydrogen and lower temperature than that of carbon monoxide, the amount of said diluent gas being meterially greater than the amount of carbon monoxide remaining after the preliminary purification, compressing and cooling said diluted mixture, and separating the hydrogen from said cooled mixture by fractionally condensing the carbon monoxide and diluent gas therefrom while in said compressed condition.

2. The process of recovering hydrogen practically free from carbon monoxide and containing only tracer of nitrogen from a mixture containing hydrogen and carbon monoxide such as water gas or the like comprising removing a substantial portion of the carbon monoxide from the mixture by preliminary purification, diluting said partially purified mixture with an amount of nitrogen materially greater than the amount of carbon monoxide remaining after the preliminary purification, compressing and cooling said diluted mixture, and separating the hydrogen from said compressed mixture by fractionally condensing the carbon monoxide and nitrogen therefrom.

3. The process as in claim 1 in which the amount of diluent gas added is several times greater than the amount of carbon monoxide remaining after the preliminary purification.

4. The process as in claim 2 in which the amount of nitrogen added is several times greater than the amount of carbon monoxide remaining after the preliminary purification.

5. The process as in claim 2 in which the amount of nitrogen added is substantially equal to the amount of carbon monoxide removed by the preliminary purification.

6. The process of obtaining hydrogen practically free from carbon monoxide although containing traces of nitrogen from gaseous mixtures containing hydrogen and carbon monoxide, such as water gas, comprising removing the greater part of the carbon monoxide from said gaseous mixture by preliminary purification adding gaseous nitrogen to the partially purified gaseous mixture, the amount of nitrogen being sufficient, when liquefied, to wash out the carbon monoxide from said mixture, subjecting the nitrogenous mixture to comparatively high pressure and cooling the compressed mixture without expansion thereof to produce a liquefaction of the nitrogen and carbon monoxide constituents of said nitrogenous mixture, and separating the gaseous hydrogen from the liquefied nitrogen and carbon monoxide.

7. The process as in claim 6 in which the cooling of the compressed mixture is produced by expansion with performance of work of the resultant carbon monoxide-free hydrogen.

GIOVANNI CICALI.